United States Patent
Lin et al.

(10) Patent No.: US 10,013,099 B2
(45) Date of Patent: Jul. 3, 2018

(54) TOUCH PANEL AND TOUCH DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventors: Shaoting Lin, Xiamen (CN); Yuping Ma, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 245 days.

(21) Appl. No.: 14/829,625

(22) Filed: Aug. 18, 2015

(65) Prior Publication Data

US 2016/0328070 A1    Nov. 10, 2016

(30) Foreign Application Priority Data

May 8, 2015    (CN) .......................... 2015 1 0232130

(51) Int. Cl.
G06F 3/045    (2006.01)
G06F 3/041    (2006.01)
G06F 3/044    (2006.01)

(52) U.S. Cl.
CPC ............ G06F 3/0416 (2013.01); *G06F 3/044* (2013.01); *G06F 3/0412* (2013.01)

(58) Field of Classification Search
None
See application file for complete search history.

(56) References Cited

U.S. PATENT DOCUMENTS

| | | | | |
|---|---|---|---|---|
| 2012/0218199 A1* | 8/2012 | Kim | ...................... | G06F 3/0412 345/173 |
| 2014/0085222 A1* | 3/2014 | Park | ...................... | G06F 3/0412 345/173 |
| 2014/0118277 A1* | 5/2014 | Kim | ......................... | G06F 3/044 345/173 |
| 2014/0362031 A1 | 12/2014 | Mo et al. | | |
| 2015/0130753 A1* | 5/2015 | Woo | ........................ | G06F 3/044 345/174 |
| 2016/0154515 A1* | 6/2016 | Mu | ........................ | G06F 3/0412 345/174 |

FOREIGN PATENT DOCUMENTS

| | | | | |
|---|---|---|---|---|
| CN | 102650916 A | 8/2012 | | |
| CN | 202364472 U | 8/2012 | | |
| CN | 203242641 U | 10/2013 | | |
| CN | 203405790 U | 1/2014 | | |
| CN | 203930738 U | 11/2014 | | |
| CN | 104391601 A | 3/2015 | | |
| CN | 10451768 A | 4/2015 | | |
| CN | 104536619 A | 4/2015 | | |
| WO | WO 2014/0139229 | * | 9/2014 | ............. G06F 3/044 |

* cited by examiner

*Primary Examiner* — Christopher R Lamb
(74) *Attorney, Agent, or Firm* — Faegre Baker Daniels LLP

(57) ABSTRACT

A touch panel including: a plurality of touch electrodes; and a plurality of touch signal lines electrically connected with the plurality of touch electrodes; wherein each of the plurality of touch electrodes is electrically connected with at least two of the touch signal lines, and the at least two touch signal lines electrically connected with the same touch electrode are electrically connected with each other via at least one conductive wire.

14 Claims, 12 Drawing Sheets

TOUCH PANEL AND TOUCH DISPLAY DEVICE

CROSS-REFERENCE TO RELATED APPLICATION

This application claims priority to Chinese Application No. 201510232130.2, filed May 8, 2015, which is herein incorporated by reference in its entirety.

TECHNICAL FIELD

The present disclosure relates to the field of touch display technologies and, in particular, to a touch panel and a touch display device.

BACKGROUND

With the development of electronic technologies, functions of display devices are no longer limited to receiving and displaying video signals. Nowadays, the display device has been integrated with a touch function, so that a control instruction can be input into the display device according to a touch operation performed by an operator on the display device.

The existing display devices with a touch function are divided into an add-on type touch screen, an on-cell touch screen, and an in-cell touch screen according to structures of the display devices. However, in any of the existing touch screens with the above various structures, touch signal lines connecting with touch electrodes are necessary. As shown in FIG. 1, each of the touch electrodes 10 is connected with one corresponding touch signal line 11. Generally, the touch signal lines 11 are arranged right below a black matrix of a color filter substrate to prevent the touch signal lines 11 from shielding light and being visible from outside. Thus, these touch signal lines 11 are relatively thin. For example, the touch signal line 11 has a width of 3 µm. However, such thin touch signal lines 11 are likely broken in fabrication, as shown by a region indicated by a dotted circle in FIG. 2, for example. Once the touch signal line 11 is broken, a touch on the touch electrode 10 corresponding to the broken touch signal line 11 cannot be responded to, thereby reducing the touch accuracy and negatively affecting the product yield.

SUMMARY

Embodiments of the present disclosure provide a touch panel and touch display device to increase the product yield, touch accuracy and the effect of the touch reliability.

In a first example, the disclosure provides a touch panel, including a plurality of touch electrodes; and a plurality of touch signal lines electrically connected with the plurality of touch electrodes;

where each of the plurality of touch electrodes is electrically connected with at least two of the touch signal lines, and the at least two touch signal lines electrically connected with the same touch electrode are electrically connected with each other via at least one conductive wire.

In a second example, the disclosure provides a touch display device. The touch display device includes a touch panel provided by the above mentioned embodiments and a driver chip which is configured for display driving and touch driving.

In the disclosure, the touch panel includes a plurality of touch signal lines. Each touch electrode is electrically connected with at least two touch signal lines and the touch signal lines corresponding to each touch electrode are electrically connected with each other via at least one conductive wire, so that the failure to respond to a touch on a corresponding touch electrode, which is caused by the broken touch signal line, can be avoided, thereby realizing an increase in the product yield and the effect of the touch reliability.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

Other features, objects and advantages of the disclosure will become apparent from the following detailed description of nonrestrictive embodiments made with reference to the accompanying drawings below, in which.

Figure 1:
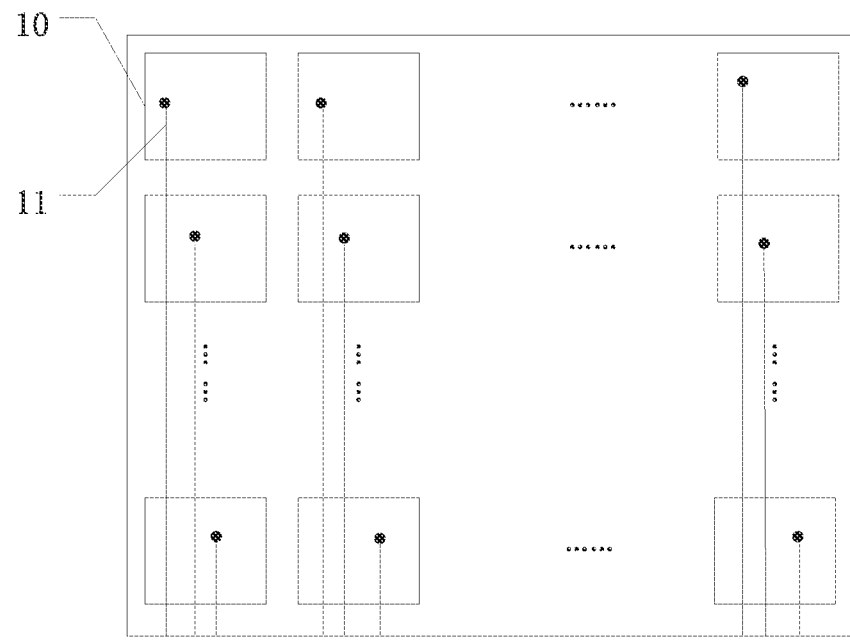
FIG. 1 is a schematic view showing connections of touch signal lines in a touch panel in the related art.
Figure 2:
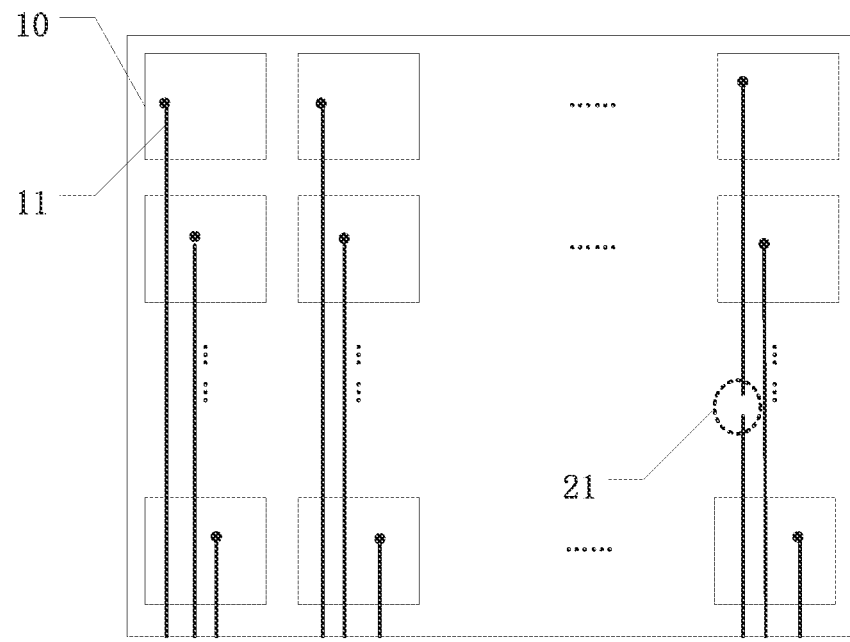
FIG. 2 is a schematic view showing a broken state of a touch signal line in the touch panel in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

The disclosure will be further described in detail below in conjunction with the accompanying drawings and embodiments. It should be noted that the specific embodiments disclosed herein are merely intended for explaining, rather than limiting, the disclosure. It should also be noted that the accompanying drawings show only parts relating to the disclosure, but not in an exhausting way, for the ease of description.

Figure 3:
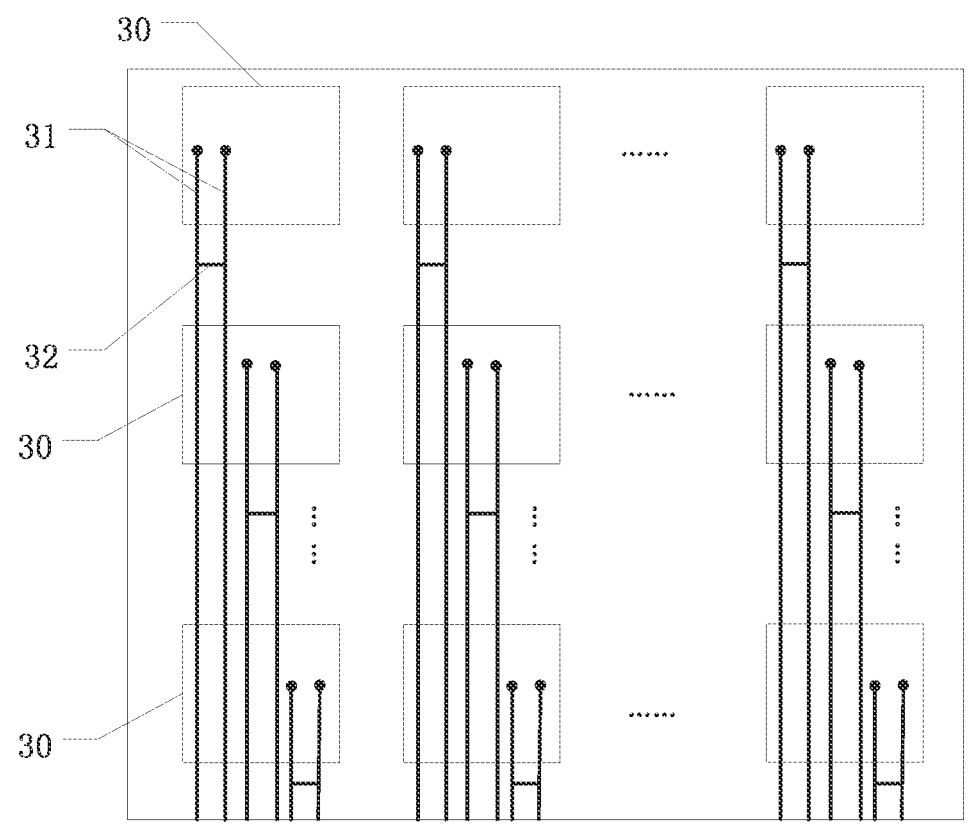
FIG. 3 is a schematic top view of a touch panel, according to embodiments of the disclosure.

Embodiments of the disclosure provide a touch panel. As shown in FIG. 3, which shows a schematic top view of a touch panel, according to embodiments of the disclosure, the touch panel includes a plurality of touch electrodes 30 and a plurality of touch signal lines 31 electrically connected with the plurality of touch electrodes 30, where each of the plurality of touch electrodes 30 is electrically connected with at least two of the touch signal lines 31, and the at least two touch signal lines 31 electrically connected with each of the touch electrodes 30 are electrically connected with each other via at least one conductive wire 32. In embodiments, each touch electrode 30 is electrically connected with two touch signal lines 31 which are electrically connected with each other via one conductive wire 32. In other embodiments, the number of touch signal lines 31 corresponding to each touch electrode 30, as well as the number of the conductive wires 32 connecting the touch signal lines 31, can be varied as actually desired.

Considering that the touch signal lines are likely broken in fabrication due to their thinness, the number of touch signal lines corresponding to each touch electrode is increased and a conductive wire is electrically connected between the touch signal lines corresponding to each touch electrode, according to embodiments of the disclosure, thereby preventing the malfunction of the touch electrode due to the broken touch signal line.

Figure 4:
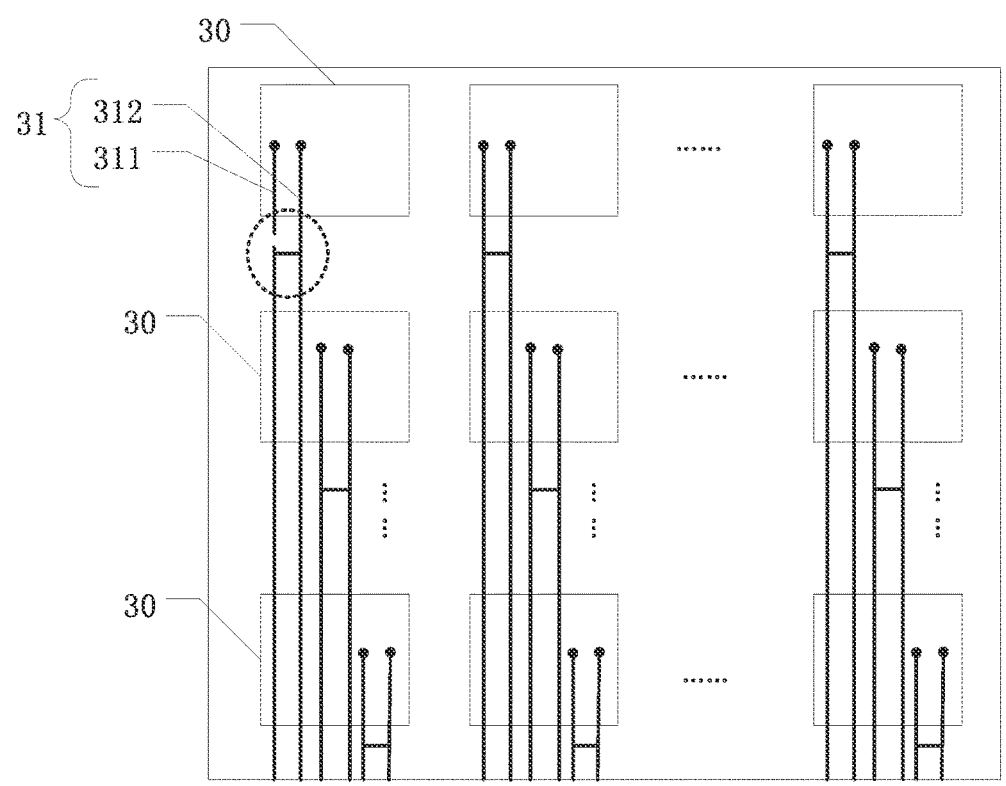
FIG. 4 is a schematic view showing the touch panel in which a touch signal line is broken, according to embodiments of the disclosure.
Figure 5:
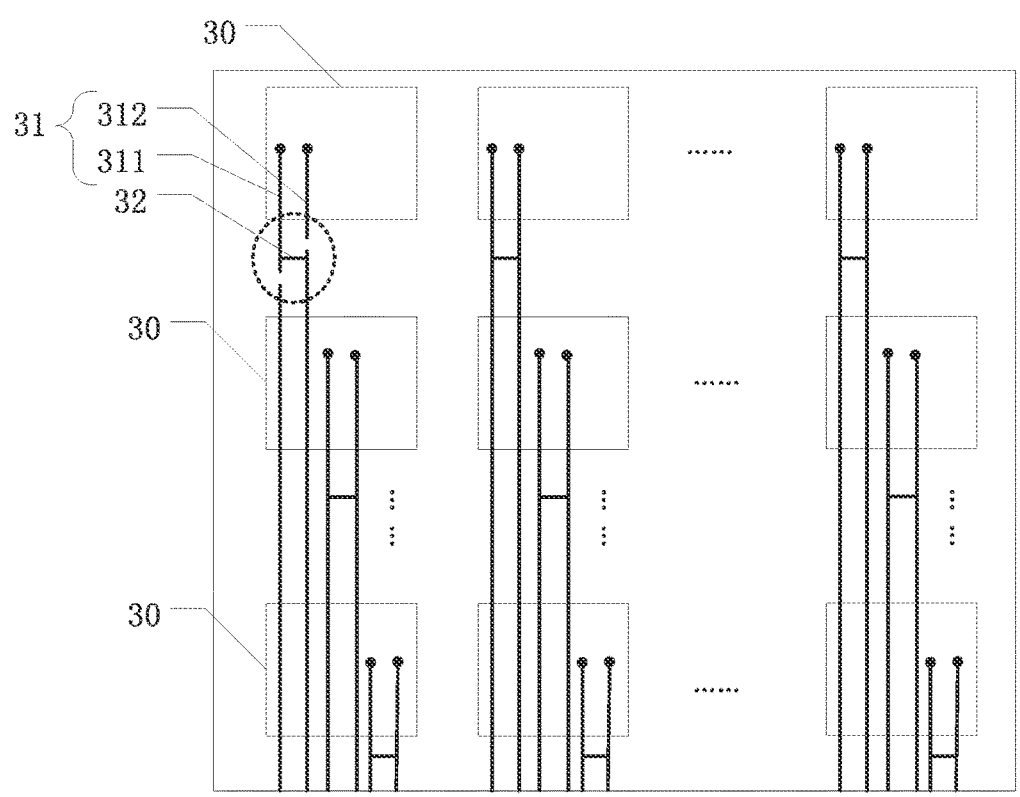
FIG. 5 is a schematic view showing another touch panel in which touch signal lines are broken, according to embodiments of the disclosure.

Referring to a region enclosed by a dotted circle in FIG. 4, touch signal lines 31 including a first touch signal line 311 and a second touch signal line 312 are electrically connected with the same one touch electrode 30, and the first touch signal line 311 is broken, in this case, the touch electrode 30 can still respond to a touch performed by a user because the second touch signal line 312 electrically connected with the touch electrode 30 is not broken. Further, even if both the first touch signal line 311 and the second touch signal line 312 are broken as shown in FIG. 5, since the conductive wire 32 is connected between the first touch signal line 311 and the second touch signal line 312, the touch electrode 30 can still respond to a touch performed by the user.

Of course, in other embodiments, the structure of the touch panel can be diversified. For example, the shapes of the touch signal line and the touch electrode may be varied, and the location of a film layer at which the touch electrode is located may be varied, as long as each touch electrode is electrically connected with at least two touch signal lines and at least one conductive wire is electrically connected between the touch signal lines corresponding to each touch electrode. Embodiments will be described in detail below.

The touch panel is suitable for an add-on type touch structure, an on-cell touch structure and an in-cell touch structure. The on-cell touch structure refers to a structure in which a touch device is attached to the top of a display device, where the display device and the touch device are individually manufactured in separate processes; the on-cell touch structure refers to a structure in which touch electrodes used for touch are directly formed on a top glass substrate of the display device; and the in-cell touch structure refers to a structure in which touch electrodes for touching are embedded in a display device, and can be employed in a touch panel with a Twisted Nematic (TN) liquid crystal driving mode, an In-Plane Switching (IPS) liquid crystal driving mode or a Fringe Field Switching (FFS) liquid crystal driving mode.

In order to decrease the thickness of the touch panel, the in-cell touch structure is employed. In the in-cell touch structure, touch electrodes of the touch panel can be specially used as electrodes for touch, or can be multiplexed (reused) as a common electrode for displaying, that is, the touch electrodes may be divided from the common electrode. As such, if the touch electrodes are multiplexed as the common electrode, the thickness of the touch panel can be further decreased. In addition, if the touch electrodes are multiplexed as the common electrode, the touch electrodes and the common electrode are fabricated by only one etching process, without needs for masks respectively fabricated for the touch electrodes and the common electrode, thereby saving costs, simplifying the fabricating process and improving the productivity.

Figure 6:
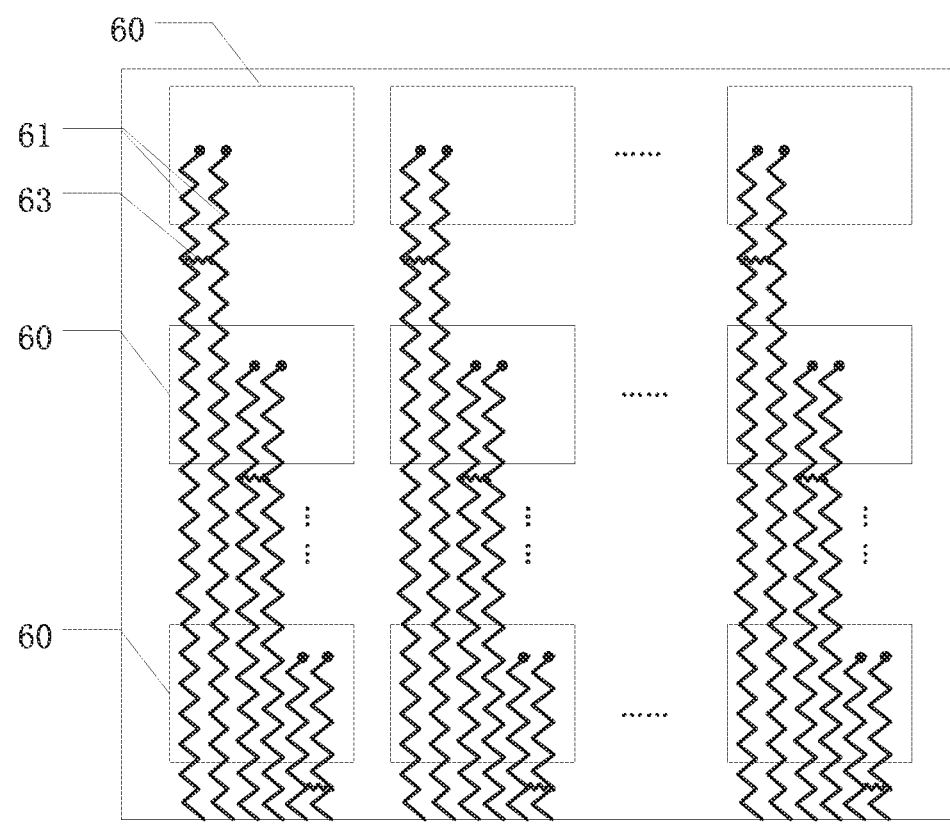
FIG. 6 is a schematic top view of still another touch panel, according to embodiments of the disclosure.

Optionally, the shapes of the touch signal line and the conductive wire of the touch panel, according to embodiments of the disclosure, are not limited to a straight line shape as shown in FIG. 3 to FIG. 5. FIG. 6 is a schematic top view of another touch panel, according to embodiments of the disclosure. As shown in FIG. 6, touch signal lines 61 corresponding to a touch electrode 60, and/or a conductive wire connected with the touch signal lines, have a zigzag shape, and may alternatively have a wave shape (not shown). In a touch panel in which some pixel units are disposed in a special arrangement, the conductive wires 63 can be configured with the zigzag shape or the wave shape to better fit the arrangement of the pixel units, thereby preventing the touch signal lines 61 and the conductive wires 63 from being visible from outside.

Figure 7:
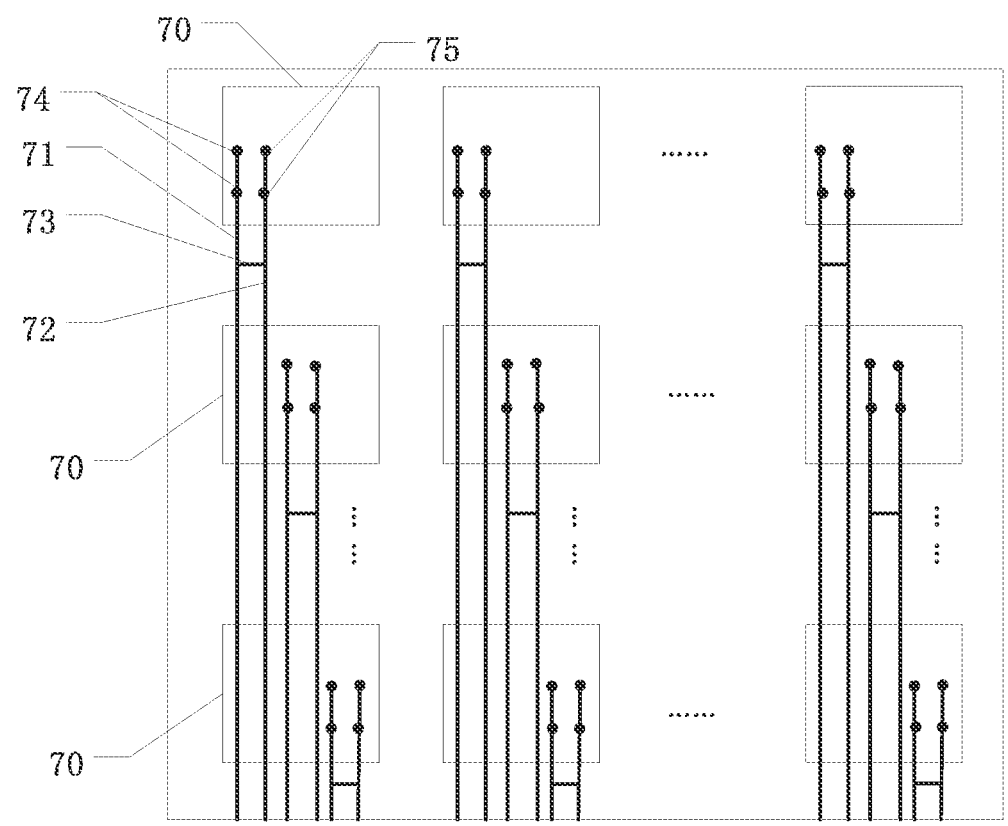
FIG. 7 is a schematic top view of still another touch panel, according to embodiments of the disclosure.

On the basis of the embodiments mentioned above, preferably, each of the plurality of touch signal lines is electrically connected with a touch electrode corresponding to the touch signal line via at least two through-holes, according to embodiments of the disclosure. As shown in FIG. 7 which is a schematic top view of still another touch panel, according to embodiments of the disclosure, the touch panel includes a plurality of touch electrodes 70 and a plurality of touch signal lines electrically connected with the plurality of touch electrodes 70. Each of the plurality of touch electrodes 70 is electrically connected with a first touch signal line 71 and a second touch signal line 72, and the first touch signal line 71 and the second signal line 72 corresponding to each touch electrode 70 are electrically connected with each other via a conductive wire 73. Each first touch signal line 71 is electrically connected with the touch electrode 70 corresponding to the first touch signal line 71 via two first through-holes 74, and each second touch signal line 72 is electrically connected with the touch electrode 70 corresponding to the second touch signal line 72 via two second through-holes 75. The advantage of this arrangement lies in that the failure to respond to a touch on a touch electrode, which is caused by poor contact between the touch electrode and a touch signal line electrically connected with the touch electrode via only one through-hole, can be avoided, and meanwhile the resistance of the touch electrode is reduced. According to embodiments of the disclosure, each touch signal line is electrically connected with the corresponding touch electrode via two through-holes, but the number of the through-holes is not limited in the disclosure. In other embodiments, the number of through-holes, through which each touch signal line is electrically connected with the corresponding touch electrode, can be varied as actually desired.

Figure 8:
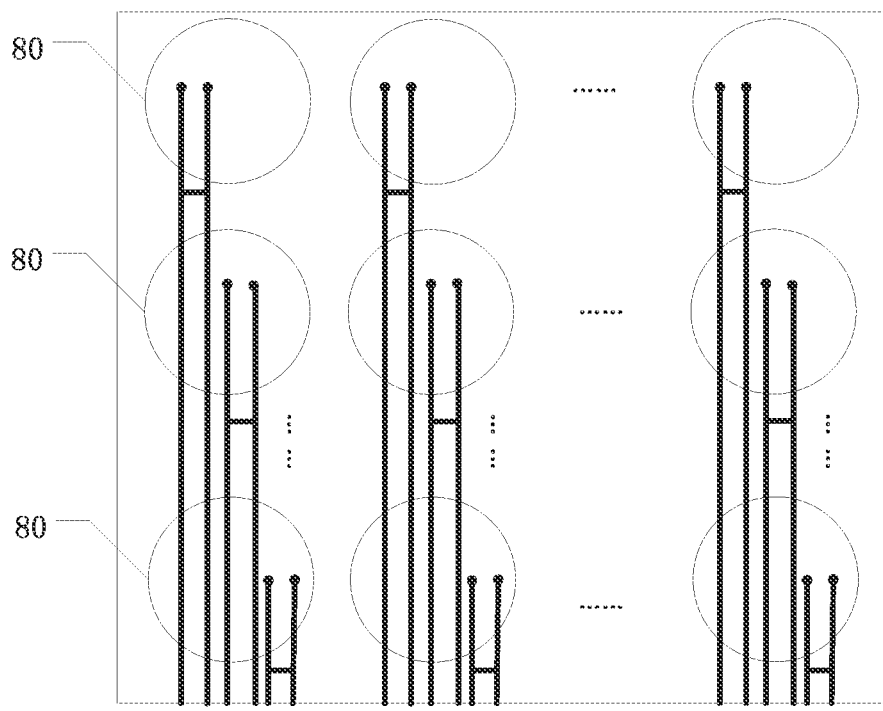
FIG. 8 is a schematic top view of still another touch panel, according to embodiments of the disclosure.

Optionally, the shape of the touch electrode in the touch panel, according to embodiments of the disclosure, is not limited to the rectangle shape as shown in FIGS. 3 to 7. As shown in FIG. 8 which is a schematic top view of still another touch panel, according to embodiments of the disclosure, the touch electrode 80 has a circular shape. Or alternatively has a diamond shape.

Figure 9:
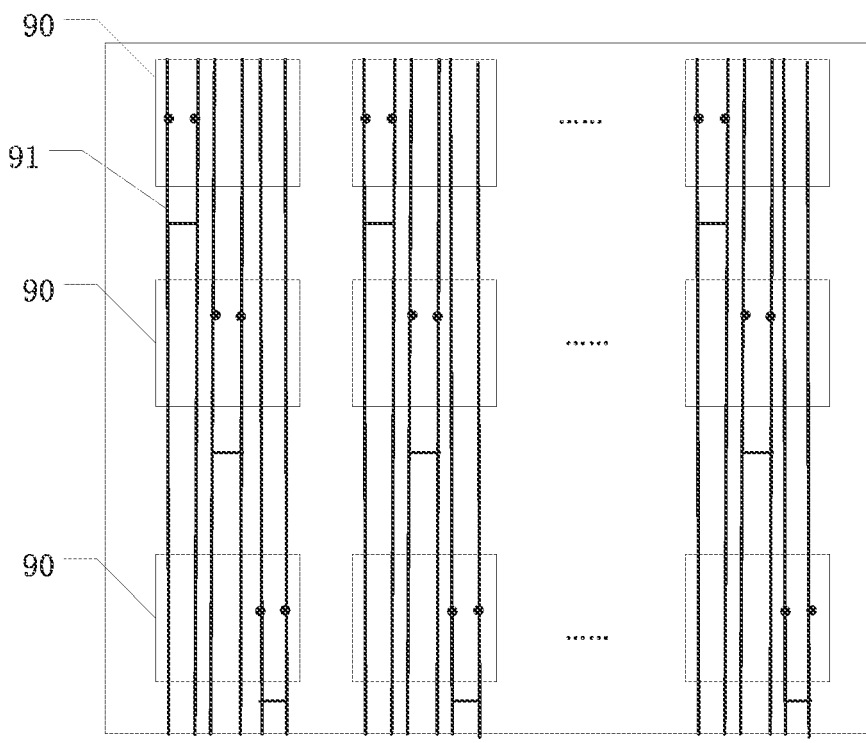
FIG. 9 is a schematic top view of still another touch panel, according to embodiments of the disclosure.

Optionally, the touch signal lines electrically connected with different touch electrodes can have the same length, according to embodiments of the disclosure. As shown in FIG. 9 which is a schematic top view of still another touch panel, according to embodiments of the disclosure, touch signal lines 91 electrically connected with a touch electrode 90 corresponding to the touch signal lines 91 are extended in such a way that the touch signal lines 91 electrically connected with different touch electrodes 90 have the same length. The advantage of this arrangement lies in that the uniform distribution of the touch signal lines on the entire touch panel is achieved, thereby increasing the luminance uniformity of the touch panel and improving the quality of displayed images.

Optionally, in order to avoid an affection on an aperture ratio of each pixel unit by the touch signal lines, the touch panel, according to embodiments of the disclosure, further includes an array substrate, and data lines and scan lines on the array substrate, where an orthogonal projection of the touch signal line onto the array substrate partly overlaps an orthogonal projection of the data line or the scan line onto the array substrate.

Further, an orthogonal projection of the conductive wire onto the array substrate partly overlaps an orthogonal projection of the data line or the scan line onto the array substrate.

Further, according to embodiments of the disclosure, the touch panel also includes an array substrate; wherein the color filter substrate has a black matrix, and orthogonal projections of the touch signal lines and the conductive wires on the array substrate are located within projections of the black on the array substrate. The aperture ratio of the touch panel is not influenced by shielding the touch signal lines through the black matrix, in addition, the light-penetration rate of a touch controller is not influenced.

Figure 10:
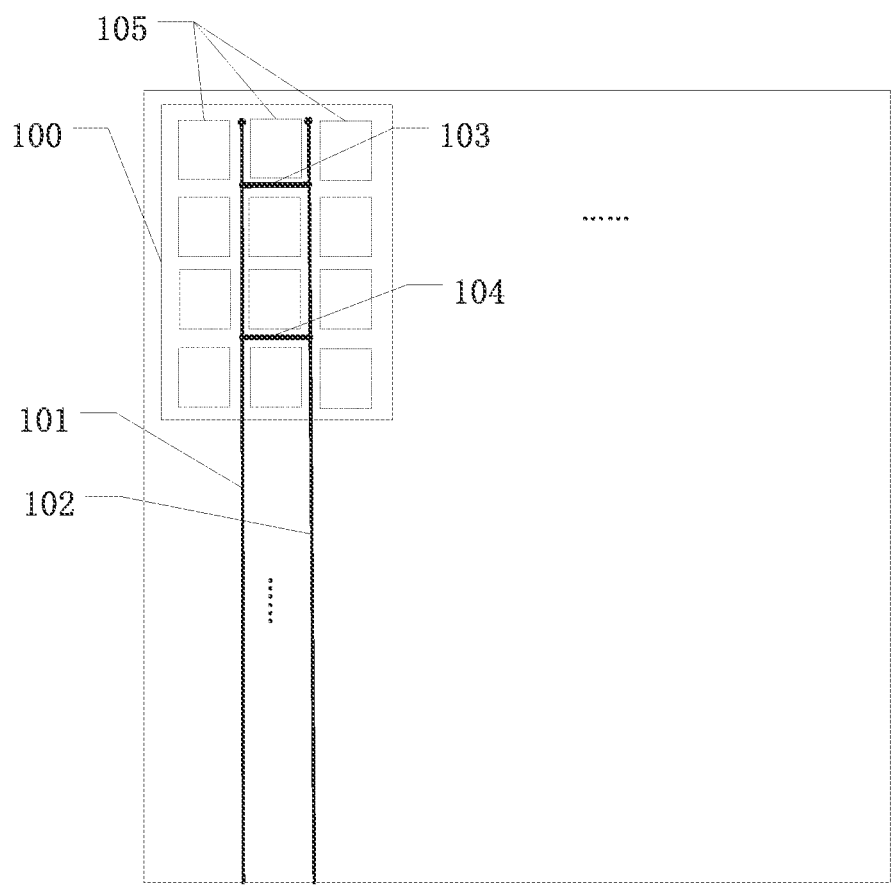
FIG. 10 is a schematic top view of still another touch panel, according to embodiments of the disclosure.

According to embodiments of the disclosure, the touch panel also includes a plurality of pixel units arranged as an array, and preferably, adjacent touch signal lines electrically connected with the same one touch electrode are spaced apart from each other by at least one row or column of pixel units. Similarly, two adjacent conductive wires electrically connecting with the touch signal lines are spaced apart from each other by at least one row or column of pixel units. In this way, the touch signal line is disposed at a gap between adjacent pixel units, and the conductive wire is disposed at a gap between adjacent pixel units, to further decrease the probability of the failure to respond to a touch on a touch electrode which is caused by the broken touch signal line. However, the touch signal lines and the conductive wires, if disposed too densely, may lead to capacitive coupling with other conductive film layers in the touch panel and affect the display effect in a certain degree, thus the number of the touch signal lines and the number of the conductive wires, as well as the distance between the touch signal lines and the distance between the conductive wires, can be varied with actual technique processes. As shown in FIG. 10 which is a schematic top view of still another touch panel, according to embodiments of the disclosure, pixel units 105 arranged as an array with four rows and three columns are shown, which is not regarded as a limitation to the disclosure. In embodiments, each touch electrode 100 corresponds to 12 pixel units 105 arranged as the array with four rows and three columns, each touch electrode 100 is electrically connected with a first touch signal 101 and a second touch signal line 102, and two or more conductive wires (which are shown as a first conductive wire 103 and a second touch signal line 104 in FIG. 10) are electrically connected between the first touch signal 101 and the second touch signal line 102 electrically connected with each touch electrode 100. In embodiments, the first touch signal line 101 is spaced apart from the second touch signal line 102 by one column of pixel units 105, and the first conductive wire 103 is spaced apart from the second conductive wire 104 by two rows of pixel units 105.

It is should be illustrated that this touch panel is suitable for self-capacitance and mutual-capacitance. In the case of the self-capacitance, one layer of touch electrodes is provided, while in the case of the mutual-capacitance, two layers of touch electrodes overlapping each other are provided, where each touch electrode is electrically with at least two touch signal lines, and the touch signal lines electrically connected with each touch electrode are electrically connected with each other via at least one conductive wire.

Further, in the touch panel. according to embodiments of the disclosure, pixel electrodes used for displaying and a common electrode can be arranged in the same one layer or in different layers, which is not limited herein.

Figure 11:
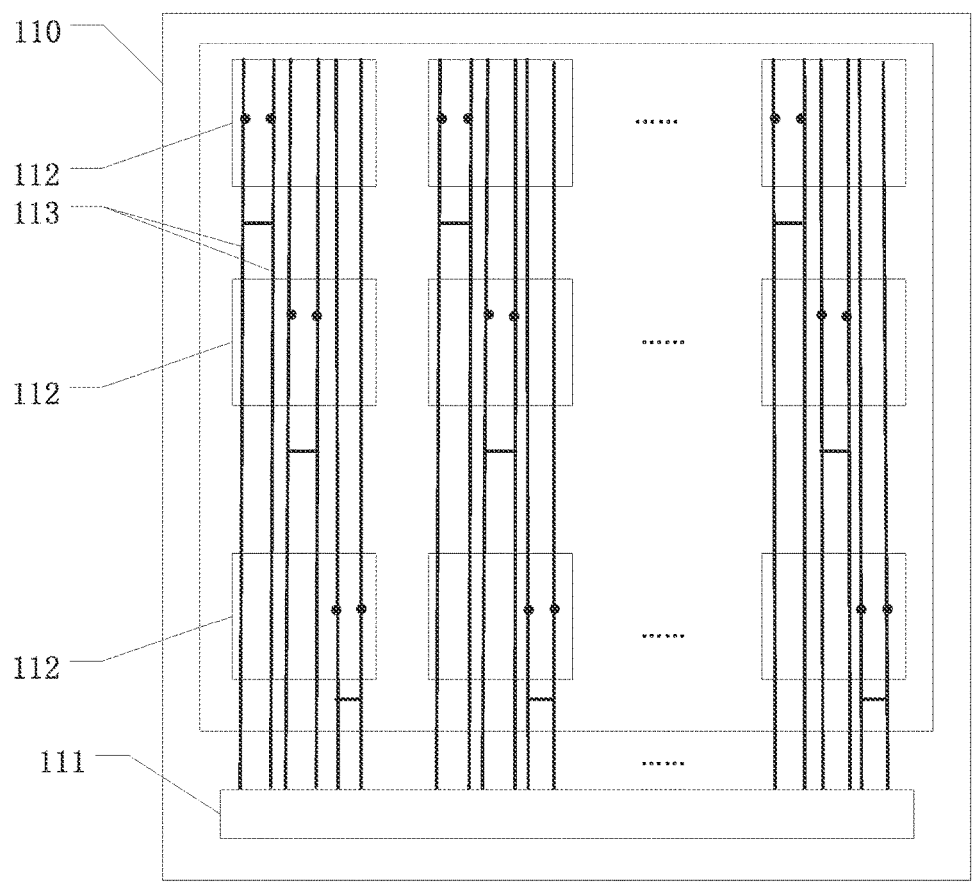
FIG. 11 is a schematic view showing the structure of a touch display device, according to embodiments of the disclosure.

Embodiments of the disclosure also provide a touch display device. As shown in FIG. 11 which is a schematic view showing the structure of a touch display device, according to embodiments of the disclosure, the touch display device includes: a touch panel 110, and a driver chip 111 configured for display driving and touch driving. The touch panel 110 may be embodied as one described in any of the above embodiments. The driver chip 111 is located on the touch panel 110, and at least two touch signal lines 113 electrically connected with each touch electrode 112 on the touch panel 110 are connected to interfaces of the driver chip 111 in a one-to-one manner.

Figure 12:
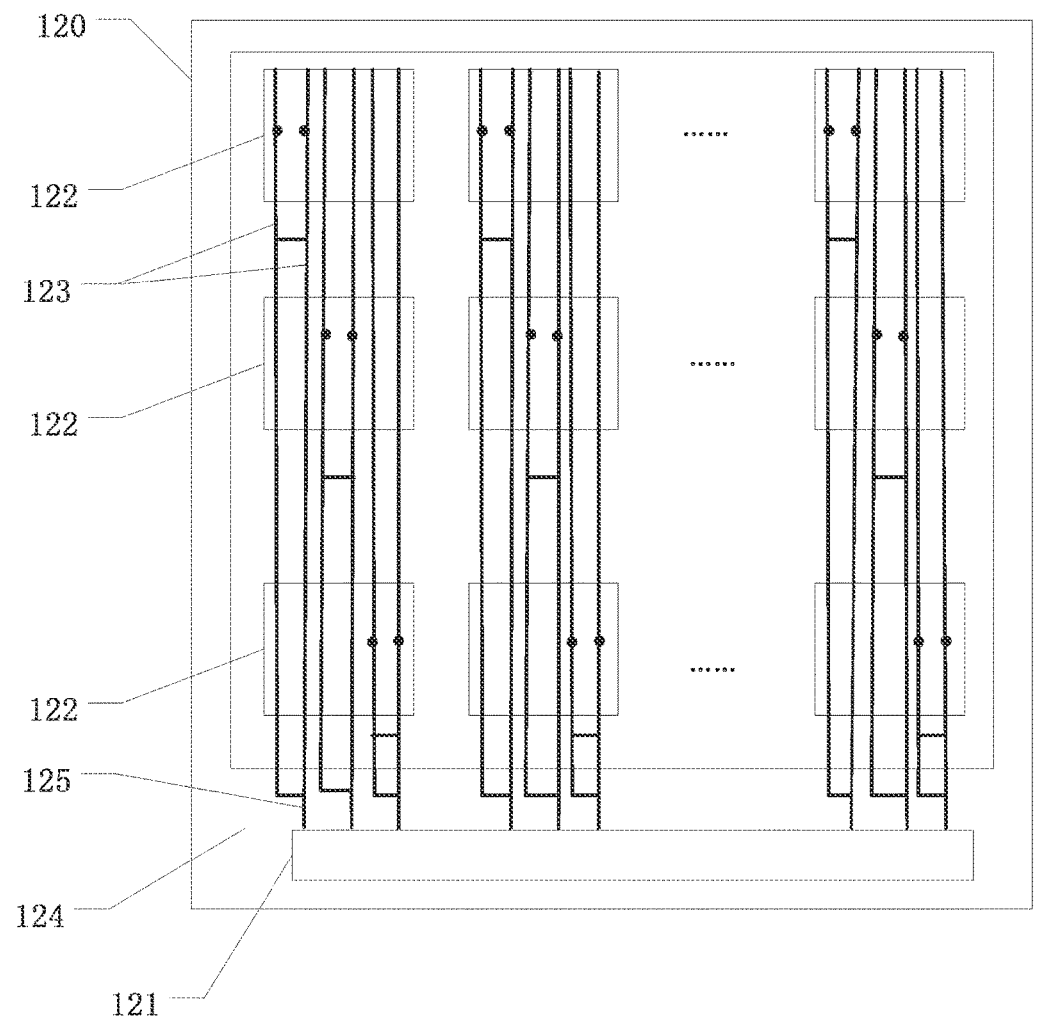
FIG. 12 is a schematic view showing the structure of another touch display device, according to embodiments of the disclosure.

Embodiments of the disclosure also provide another touch display device. As shown in FIG. 12 which is a schematic view showing the structure of another touch display device, according to embodiments of the disclosure, the touch display device includes a touch panel 120 and a driver chip 121, where the touch panel 120 may be embodied as one described in any of the above embodiments. The driver chip 121, which is used for display driving and touch driving, is located on the touch panel 120, and at least two touch signal lines 123 electrically connected with each touch electrode 122 are together connected with a chip lead wire 125 in a non-display region 124, where the chip lead wires 125 are connected to interfaces of the driver chip 121 in a one-to-one manner. The advantage of this arrangement lies in that the interfaces of the driver chip are reduced, thereby decreasing the production cost.

Figure 13:
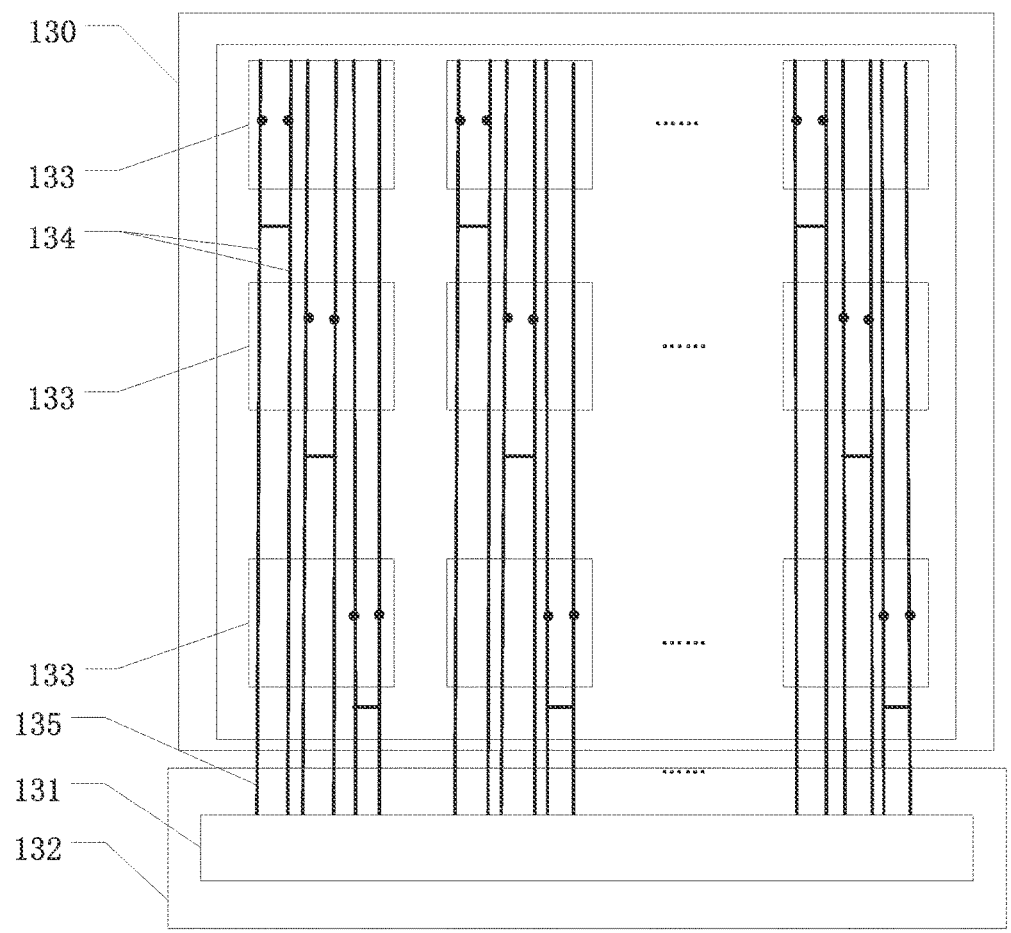
FIG. 13 is a schematic view showing the structure of still another touch display device, according to embodiments of the disclosure.

Embodiments of the disclosure provide still another touch display device. As shown in FIG. 13 which is a schematic view showing the structure of another touch display device, according to embodiments of the disclosure, the touch display device includes a touch panel 130 and a driver chip 131, where the touch panel 130 may be embodied as one described in any of the above embodiments. The driver chip 131, which is used for display driving and touch driving, is located on a flexible printed circuit board connected with the touch panel 130, at least two touch signal lines 134 electrically connected with each touch electrode 133 are connected with chip lead wires 135 on the flexible printed circuit board 132 in a one-to-one manner, and the chip lead wires 135 are connected with interfaces of the driver chip 131 in a one-to-one manner.

Figure 14:
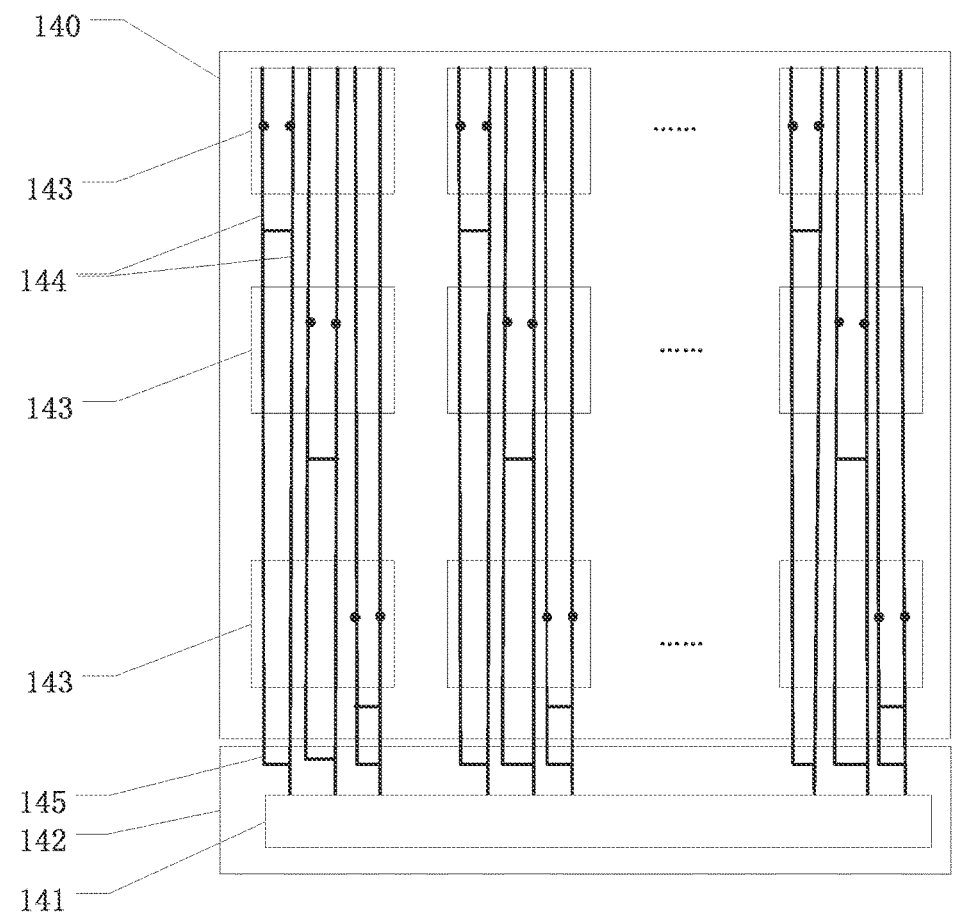
FIG. 14 is a schematic view showing the structure of still another touch display device, according to embodiments of the disclosure.

Embodiments of the disclosure also provide another touch display device. As shown in FIG. 14 which is a schematic view showing the structure of still another touch display device, according to embodiments of the disclosure, the touch display device includes a touch panel 140 and a driver chip 141, where the touch panel 140 may be embodied as one described in any of the above embodiments. The driver chip 141 is used for display driving and touch driving and is located on a flexible printed circuit board 142 connected with the touch panel 140, at least two touch signal lines 144 electrically connected with each touch electrode 143 are connected with chip lead wires 145 on the flexible printed circuit board 142 in a one-to-one manner, and the chip lead wires 145 corresponding to each touch electrode 143 are connected together before being connected to an interface of the driver chip. Therefore, the chip lead wires 145 corresponding to each touch electrode 143 are connected with one interface of the driver chip 141. The advantage of this arrangement lies in that the interfaces of the driver chip are reduced, thereby decreasing the production cost.

Since the touch display device, according to embodiments of the disclosure, employs the above-described touch panel, in which each touch electrode is electrically connected with at least two touch signal lines and the touch signal lines corresponding to each touch electrode are electrically connected with each other via at least one conductive wire, so that the failure to respond to a touch on a touch electrode, which is caused by the broken touch signal line, can be avoided, thus the touch display device can have the same advantage.

It should be noted that the touch display device provided by any of the embodiments can also include circuits and means for normal operations of the touch display device, and the touch display device can be any one of a mobile phone, a tablet computer, electronic paper and an electronic photo frame.

The embodiments of the disclosure and the technical principles used therein have been described as above. It should be appreciated by those skilled in the art that the disclosure is not limited to the particular embodiments described herein, and any apparent alterations, modification and substitutions can be made by those skilled in the art without departing from the scope of the disclosure. Accordingly, while the disclosure is described in detail through the above embodiments, the disclosure is not limited to the above embodiments and can further include other additional equivalent embodiments without departing from the concept of the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

We claim:

1. A touch panel, comprising:
   a plurality of touch electrodes; and
   a plurality of touch signal lines electrically connected with the plurality of touch electrodes;
   wherein each of the plurality of touch electrodes is electrically connected with at least two of the touch signal lines, and the at least two touch signal lines electrically connected with a same touch electrode are electrically connected with each other via at least one conductive wire,
   wherein the at least two touch signal lines electrically connected with the same touch electrode have one-to-one correspondent output pins, and the at least one conductive wire is disposed in a display region of the touch panel.

2. The touch panel of claim 1, wherein, the touch electrode functions as a common electrode for displaying in an image displaying period.

3. The touch panel of claim 1, wherein, at least one of the touch signal lines and the conductive wire has a straight line shape, a zigzag shape or a wave shape.

4. The touch panel of claim 1, wherein, each of the plurality of touch signal lines is electrically connected with the touch electrode corresponding to the touch signal line via at least two through-holes.

5. The touch panel of claim 1, wherein, each of the touch electrodes has a rectangle shape, a diamond shape or a circular shape.

6. The touch panel of claim 1, wherein the touch signal lines electrically connected with different touch electrodes have the same length.

7. The touch panel of claim 1, further comprising:
   an array substrate; and
   data lines and scan lines on the array substrate,
   wherein an orthogonal projection of the touch signal lines onto the array substrate partly overlaps an orthogonal projection of the data lines and scan lines onto the array substrate.

8. The touch panel of claim 1, further comprising:
   an array substrate; and
   data lines and scan lines on the array substrate,
   wherein an orthogonal projection of the conductive wire onto the array substrate partly overlaps an orthogonal projection of the data lines and scan lines onto the array substrate.

9. The touch panel of claim 1, further comprising:
   a plurality of pixel units arranged as an array, wherein adjacent touch signal lines electrically connected with the same one touch electrode are spaced apart from each other by at least one row or column of pixel units.

10. The touch panel of claim 1, further comprising:
    a plurality of pixel units arranged as an array, wherein the at least two touch signal lines electrically connected with the same one touch electrode are electrically connected with each other via a plurality of conductive wires, and adjacent two of the plurality of conductive wires are spaced apart from each other by at least one row or column of pixel units.

11. The touch panel of claim 1, further comprising:
    an array substrate; and
    a color filter substrate opposite to the array substrate,
    wherein a black matrix is disposed on the color filter substrate, and orthogonal projections of the touch signal lines and orthogonal projections of the conductive wire onto the array substrate are located within an orthogonal projection of the black matrix onto the array substrate.

12. A touch display device, comprising:
    a touch panel; and
    a driver chip, configured for display driving and touch driving;

wherein the touch panel comprises:
a plurality of touch electrodes; and
a plurality of touch signal lines electrically connected with the plurality of touch electrodes;
wherein each of the plurality of touch electrodes is electrically connected with at least two of the touch signal lines, and the at least two touch signal lines electrically connected with a same touch electrode are electrically connected with each other via at least one conductive wire,
wherein the at least two touch signal lines electrically connected with the same touch electrode have one-to-one correspondent output pins, and the at least one conductive wire is disposed in a display region of the touch panel.

13. The touch display device of claim 12, wherein, the driver chip is located on the touch panel, and the at least two touch signal lines electrically connected with each touch electrode are connected to interfaces of the driver chip in a one-to-one manner.

14. The touch display device of claim 12, wherein, the driver chip is located on a flexible printed circuit board connected with the touch panel, the at least two touch signal lines electrically connected with each touch electrode are connected with chip lead wires on the flexible printed circuit board in a one-to-one manner, and the chip lead wires are connected with interfaces of the driver chip in a one-to-one manner.

* * * * *